United States Patent

Hobson

[11] Patent Number: 5,989,422
[45] Date of Patent: Nov. 23, 1999

[54] OIL SKIMMER APPARATUS

[76] Inventor: Mark Thomas Hobson, 7527 Chagrin Rd., Chagrin Falls, Ohio 44023

[21] Appl. No.: 07/950,802

[22] Filed: Sep. 24, 1992

[51] Int. Cl.⁶ .................................................. B01D 17/02
[52] U.S. Cl. .................... 210/249; 210/400; 210/DIG. 3; 474/101; 474/142; 474/186
[58] Field of Search ...................................... 210/400, 693, 210/783, DIG. 3, 242.3, 776, 691, 249, 401; 474/101, 142, 185, 186; 198/494, 643, 805, 806, 835, 842

[56] References Cited

U.S. PATENT DOCUMENTS

| | | | |
|---|---|---|---|
| 2,095,203 | 10/1937 | Peets | 474/144 |
| 2,391,642 | 12/1945 | Reed | 198/523 |
| 2,693,759 | 11/1954 | Abellanet | 198/643 |
| 3,055,229 | 9/1962 | Mecham | 198/835 |
| 3,344,062 | 9/1967 | Kosnar | 210/693 |
| 3,363,476 | 1/1968 | Brown | 474/185 |
| 3,375,725 | 4/1968 | Mathison | 474/153 |
| 3,430,506 | 3/1969 | Stone | 198/835 |
| 3,995,487 | 12/1976 | Locke | 198/835 |
| 4,067,438 | 1/1978 | Spurr et al. | 198/805 |
| 4,303,523 | 12/1981 | Ruppnig | 210/386 |
| 5,062,953 | 11/1991 | Lewan | 210/400 |
| 5,223,128 | 6/1993 | Combrowski | 210/138 |

OTHER PUBLICATIONS

Abanaki Corporation literature "Tote–It Portable Oil Skimmer Gives Total Convenience for All–Round Use" Abanaki Corporation Drawing No. 8300, Sep. 16, 1988.
Abanaki Corporation literature "Oil Skimmers", © 1989–011589A–3.
Abanaki Drawing No. 8300, dated Jul. 21, 1986.

*Primary Examiner*—Matthew O. Savage
*Attorney, Agent, or Firm*—Watts, Hoffmann, Fisher & Heinke Co., L.P.A.

[57] ABSTRACT

An oil skimmer of the endless belt type which is transportable as a unit is disclosed. The unit has an adjustment for adjusting the location of the axis of head pulley rotation and a floating tail pulley to assure accurate tracking of the belts on the pulleys and consistent and appropriate tension on the belt. The tail pulley features L-shaped spokes having legs that provide limited pulley-to-belt contact, minimizing oil transfer from the belt to the tail pulley, and also providing a mechanism for forcing oil against a descending belt reach to provide enhanced oil pick-up.

20 Claims, 3 Drawing Sheets

5,989,422

OIL SKIMMER APPARATUS

TECHNICAL FIELD

This invention relates to an apparatus for separating oil from water and more particularly, to an oil skimmer assembly which may be readily transported as a unit from one application to another.

BACKGROUND OF THE INVENTION

With oil skimmers utilizing endless belts, typically, the belt is suspended from a driven head pulley. The belt is also passed around a tail pulley that is positioned in a body of water. When the head pulley is rotatably driven, a descending reach of the belt on entering the body of water will pick up surface oil and carry that oil around the tail pulley to an ascending reach of the belt. Wipers are positioned below of the head pulley near the top of the descending reach to scrape oil from the surface of the belt. Collection pans positioned below the wipers receive the separated oil and deliver the separated oil to a collection vessel for recycling or appropriate disposal.

In the past, the tail pulleys have usually either been mounted in a vessel containing the oil and water to be separated or alternately, supported exclusively by the belt. As an example of the latter, if oil is to be removed from a contaminated water well, an elongated belt supporting a tail pulley is dropped into the well, and the weight of the pulley and the belt provide belt tension. Clearly, if the belt breaks, there is a problem because the pulley will be dropped into the well and either lost or, at best, retrievable only through a successful "fishing" operation. Even if the belt does not break, on occasion, a pulley will slip out of the belt as the belt is lowered or during operation, and once again, an operator has, at best, a difficult retrieval process to confront.

Where tail pulleys are rotatably mounted in tanks, as an example, other problems manifest themselves. If the axes of rotation of the head and tail pulleys are not precisely parallel, the belt will not track properly and excessive wear can occur. If the belt is steel, the wear is exacerbated and considerable damage can be caused to both the belt and either or both of the pulleys. Another problem is that it is difficult to obtain and maintain proper belt tension. Here again, the problem is exacerbated if the belt is steel. If a piece of debris gets caught between the belt and the tensioned bottom pulley, the belt will inevitably become damaged due to excessive tension. Further, if the head pulley is equipped with magnets to drive the belt, a malaligned or protruding magnet can cause excessive belt tension that results in belt failure.

Attempts have been made to provide portable oil skimmers which may be transported from place to place as a unit so that the unit may be installed as needed at remote locations. These attempts have all suffered shortcomings, primarily due to the belt tracking and breakage problems.

Another problem is that when endless belt oil skimmers are used in quiescent bodies of water, their efficiencies can be relatively poor. The relatively poor efficiency is due to the fact that the belt picks up oil as it enters a water body and if the body is quiescent, the surface in the vicinity of belt entry soon becomes relatively oil free. Further, pick-up must wait for a relatively slow migration of oil from portions of the body surface remote from the belt entry location.

SUMMARY OF THE INVENTION

An oil skimmer made in accordance with the present invention is readily suited to be transported as a unit and yet does not suffer the belt breakage and tracking problems of prior attempts. A skimmer made in accordance with this invention has a frame which includes a motor support section which is near the top when the skimmer is in use. A gear motor is pivotally mounted on the support section. The pivotal mounting, together with an adjustment interposed between the motor and the support section, permit ready adjustment of the alignment of the rotation axis of a motor output shaft until a driven belt appropriately tracks on a head pulley and does not engage and excessively wear the belt and side flanges of the head pulley.

A stabilizer bar depends from the support section when the skimmer is in use. A headed shaft carries a tail pulley and connects it to the stabilizer bar. The tail pulley is free to float radially and axially relative to the headed shaft through a predetermined range of motion. The headed shaft permits the tail pulley to float so that tension on an endless belt which is around the two pulleys, is provided by the weight of the tail pulley and the belt itself. While the weight of the belt and tail pulley provide the tension, the headed shaft nonetheless provides a constraint on the range of tail pulley motion relative to the stabilizer bar so that, as an example, should the belt break, the tail pulley is still connected to the remainder of the skimmer. Securement of the tail pulley to the stabilizer bar also enables transport of the skimmer as a unit.

Because the tail pulley is floatingly mounted and the orientation of the motor output shaft and with it the head pulley, is adjustable, the tracking problems and the attendant excessive belt and pulley wear experienced with the prior art are avoided. Since the tail pulley is floating within a limited range, prior problems in obtaining and maintaining appropriate tension with a mounted pulley are avoided while the "fishing expeditions," which all too frequently occurred with prior art floating pulleys, are avoided.

Another feature of the invention resides in the provision of a tail pulley provided with a circumferentially spaced set of L-shaped spokes. The arms of the spokes are positioned radially while the legs project orthogonally from the outer ends of the arms in the direction of pulley rotation. The spokes also function to agitate the body and push oil on the surface toward the belt entry, oil pick-up location.

Accordingly, an object of the invention is to provide a novel and improved oil skimmer which is transportable as a unit, and a method of operating an oil skimmer to minimize pulley and belt wear and problems attended to belt breakage.

BRIEF DESCRIPTION OF THE DRAWINGS

FIG. 2A is an enlarged view of the pulley portion indicated by the circle 2A of FIG. 2;

DETAILED DESCRIPTION OF THE PREFERRED EMBODIMENT

Figure 1:
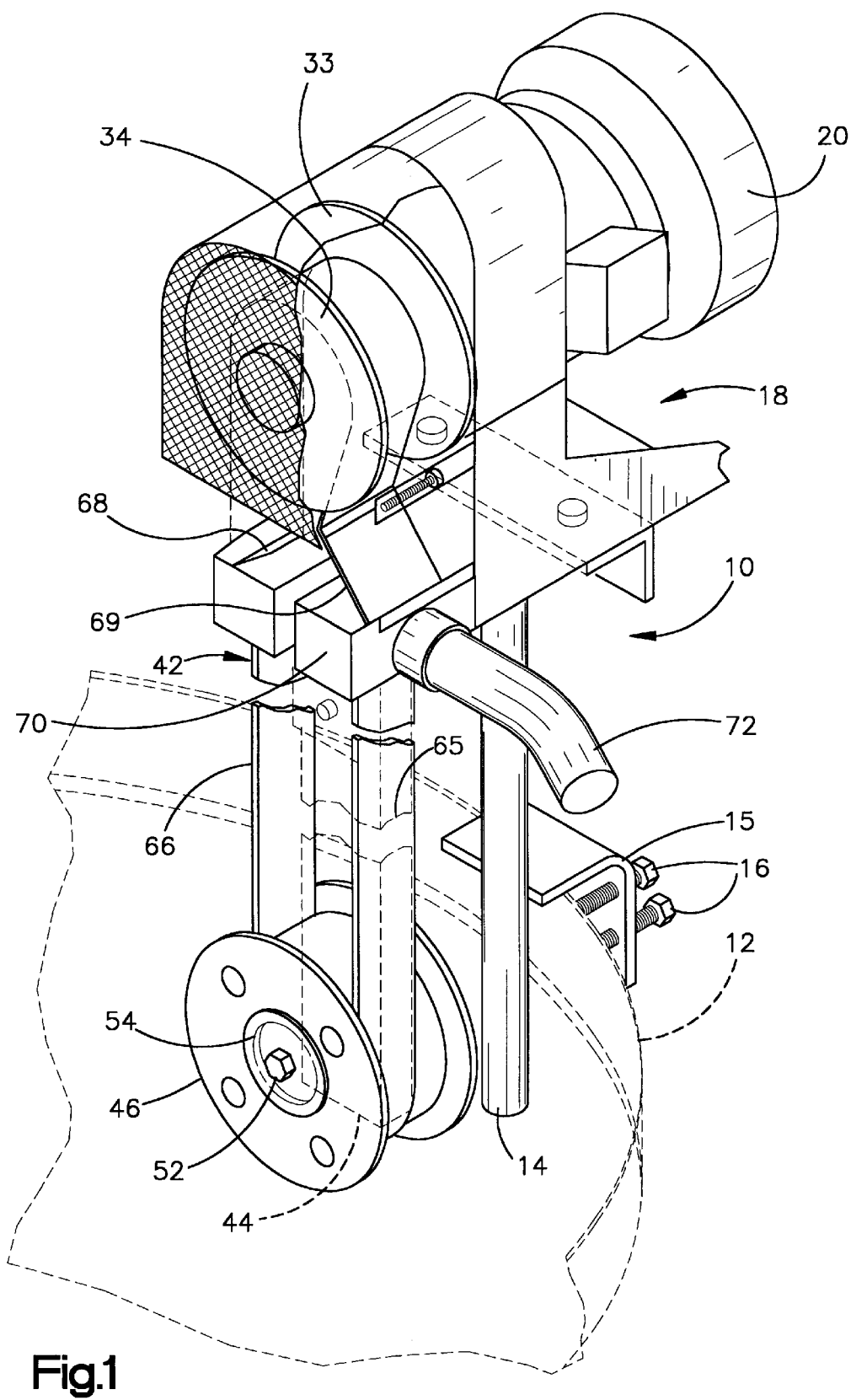
FIG. 1 is a perspective view showing the improved oil skimmer of the present invention mounted on, for purposes of illustration, a 55-gallon drum shown in phantom.
Figure 2:
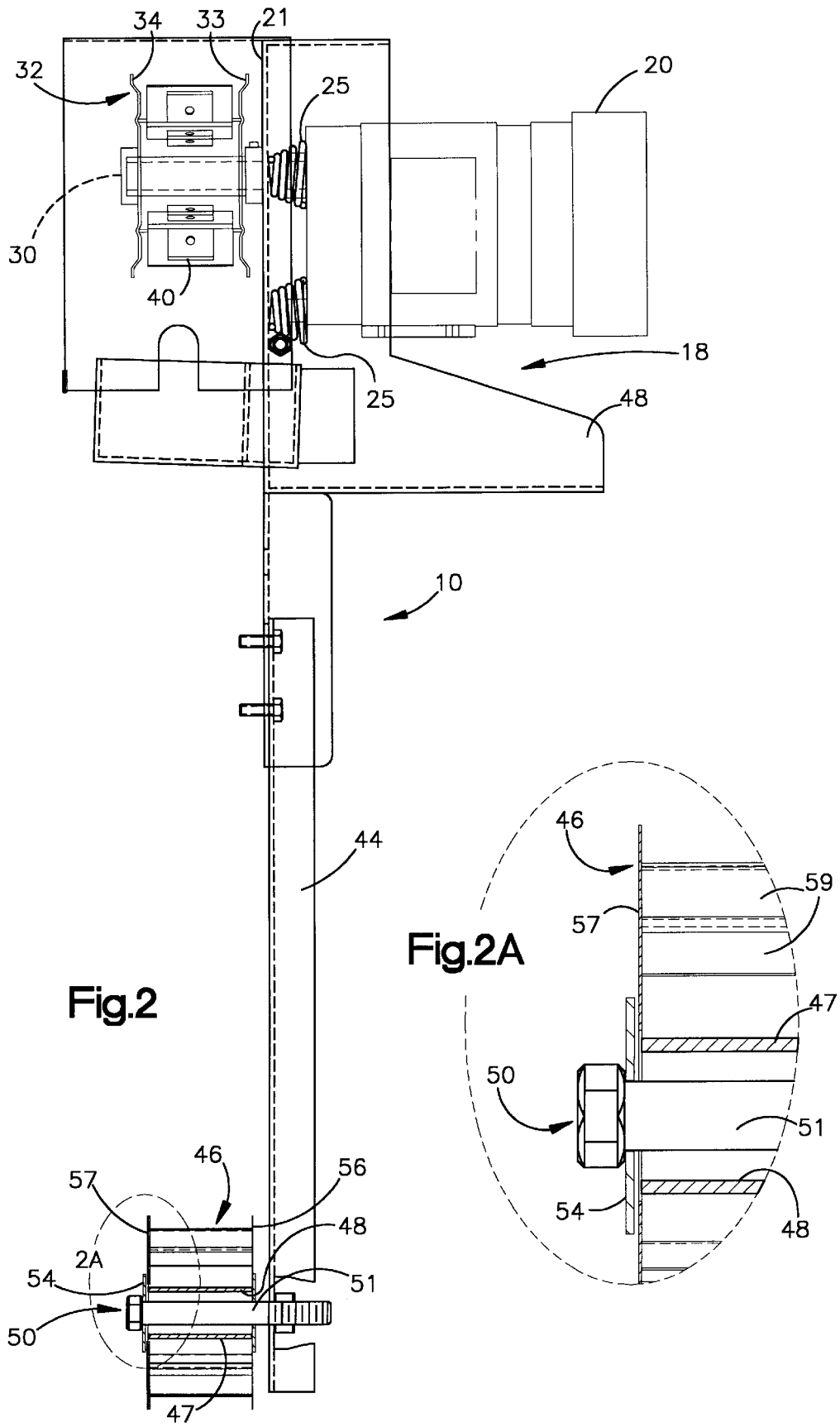
FIG. 2 is a sectional view of the skimmer of FIG. 1.

Referring now to the drawings of FIGS. 1 and 2 in particular, an oil skimmer embodying the present invention is shown generally at 10. In FIG. 1, the oil skimmer is shown mounted on a 55-gallon drum illustrated in phantom at 12. As shown, the skimmer 10 is positioned to remove surface oil from a body of water contained in the drum.

A support arm 14 is fixed to a mounting bracket 15. The support arm 14 is clamped against the inner surface of the drum 12 by bolts 16 which are threaded into the mounting bracket 15.

The support arm 14 forms a part of a frame. The frame also includes an upper motor support section 18. A gear motor 20 is connected to a vertical portion 21 of the support section 18 by three bolts 22. Springs 25 are respectively around the bolts 22 and interposed between the bolt heads and the vertical portion 21. Adjustment of the bolts against the action of the springs adjusts the attitude of an output shaft 30 of the gear motor 20. Thus, horizontal angular adjustments are accomplished by adjusting an upper pair 22a, 22b of the bolts 22. Vertical adjustment is accomplished by adjusting a lower bolt 22c, the upper bolts, or all three of the bolts.

Figure 3:
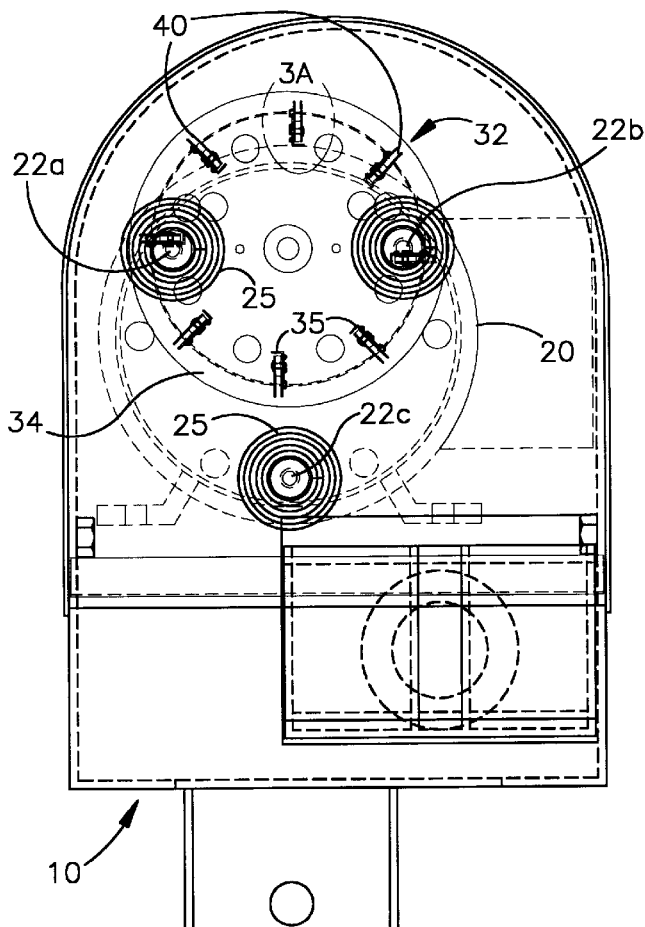
FIG. 3 is a fore shortened sectional view on an enlarged scale with respect to FIGS. 1 and 2 showing the head pulley, the motor alignment adjustment, the tail pulley and the tail pulley support shaft.
Figure 3A:
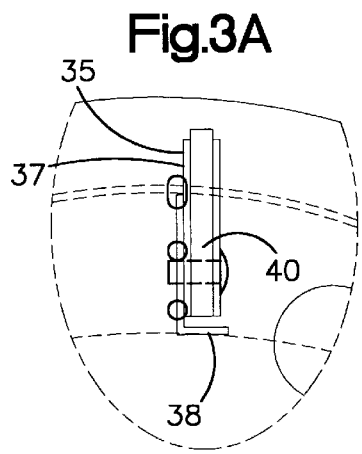
FIGS. 3A and 3B are enlarged views of the head and tail pulley portions indicated by the circles 3A and 3B of FIG. 3.
Figure 3B:
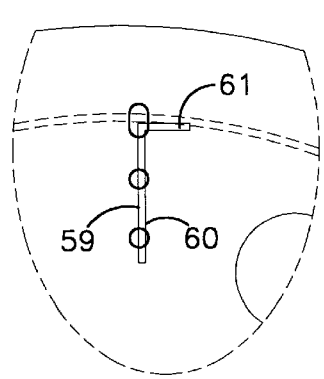

A head pulley 32 is mounted on the output shaft 30. The head pulley includes inner and outer side flanges 33, 34 which are, in the embodiment shown, connected together in spaced relationship by a set of spaced L-shaped spokes 35. As is best seen in FIG. 3A, each of the head pulley spokes is L-shaped in cross section with arms 37 being disposed radially and legs 38 projecting orthogonally from the arms 37 at the inner ends of the arms.

A set of magnets 40 is provided. Each magnet is mounted in axially spaced relationship on one of the spoke arms 37 with the arm legs 38 serving to support the magnets. The magnets 40 have outer surfaces disposed in an imaginary cylinder which is coaxial with the shaft 30 in order that the magnets drivingly engage an endless steel belt 42.

A stabilizer bar 44 depends from the support section 18, forming a further part of the frame. The stabilizer bar projects downwardly and, when positioned for use as illustrated in FIG. 1, into the body of liquid contained in the drum 55.

A tail pulley 46 is provided and is positioned at least partially in the body of liquid when the device is in use. The tail pulley 46 includes a hub 47, having a through bore 48. A bolt 50, having a body 51 of a diameter less than the diameter of the bore 48, extends through the bore and is threaded into the stabilizer bar 44. A washer 54 of a diameter greater than the bore 48 is around the body 51 and between bolt head 52 and the tail pulley 46.

As is best seen in FIG. 2, the bolt body 51 is axially longer than the axial dimension of the tail pulley 46. The bolt 50, together with the washer 54, function as a tail pulley shaft permitting the tail pulley to float relative to the shaft by an amount limited radially to the difference between diameter to the bore 48 and of the body 51. Floating motion of the tail pulley axially is limited by constraint of the stabilizer bar 44 and the washer 54 and thus to a distance which is the difference between the axial length of the body 51 and the hub 47.

The tail pulley 46 is supported by the belt 42 and, as has been indicated, free to float within a limited range relative to the bolt 50. The tail pulley, like the head pulley, has spaced inner and outer annular flanges 56, 57. The flanges are secured to the hub 47 near its ends. The tail pulley also has its inner and outer flanges interconnected by a circumferentially spaced set of L-shaped spokes 59. Arms 60 of the spokes 59, like the arms 37 of the head pulley spokes 32, are radially disposed. In contrast to the head pulley, legs 61 of the tail pulley spokes project orthogonally from the arms 60 at the radially outward ends of the arms. The legs 61 project from the arms 60 in the direction of pulley rotation as indicated by arrow 63, FIG. 3. The arms have outer surfaces disposed in an imaginary cylinder that is coaxial with the hub 47 and are sequentially in driven engagement with the belt 42.

Operation

In use, the oil skimmer 10 is carried as a unit to the body of water from which oil on the surface is to be removed. If the body is in a 55-gallon drum, as illustrated in phantom in FIG. 1, the unit is then mounted on the barrel and the bolts 16 are tightened to clamp the support arm 14 against the barrel and fix the skimmer 10 in place.

The motor 20 is then energized to cause the head pulley 32 to rotate in a clockwise direction. Through the engagement of the magnet pairs 40, the steel belt 42 is driven such that a descending reach 65 descends into the body of liquid in the drum. As the descending reach 65 enters the drum, assuming there is oil on the surface of the water, the oil will adhere to both inner and outer faces of the belt. The belt then passes around the tail pulley 46. Due to the use of the spokes 59 rather than a cylindrical surface, transfer of oil from the inner surface of the belt 42 to the tail pulley is minimized.

An ascending reach 66 of the belt 42 carries the oil upwardly to and over the head pulley 32. At a location near the top of the descending reach 65, inner and outer wipers 68, 69, of conventional construction, engage the descending reach 65 and wipe the oil from it. The wiped oil is caught by a collection vessel 70 and thence discharged through a discharge hose 72 for suitable recycling or disposal.

As the operation continues, appropriate tension is maintained on the belt through the weight of the belt itself and the tail pulley. The weight of the two alone provides the tension because the tail pulley is free to float within the described limited range of radial and axial movement.

Should there be a problem with the belt tracking appropriately on the head pulley, adjustment is accomplished by loosening or tightening the adjustment bolts 22 until the belt is tracking properly between, and without engaging, the inner and outer flanges 33, 34.

The tail pulley spokes provide one of the outstanding features of the invention. That is, that the L-shaped spokes tend to agitate the fluid. Ideally, the tail pulley is only partially submerged so that the spokes will break the surface as they approach their maximum height. Since the spokes are L-shaped with their legs projecting orthogonally in the direction of rotation, the spokes tend to trap surface oil and push the surface oil toward the descending reach 65 to enhance the oil pick-up efficiency of the belt.

Although a mechanism embodying the present invention has been illustrated and described in considerable detail, the present invention is not to be considered limited to the precise construction disclosed. Various adaptations, modifications and uses of the invention may occur to those skilled in the art to which the invention relates and the intention is to cover all such adaptations, modifications and uses which fall within the spirit or scope of the appended claims.

I claim:

1. A transportable oil skimmer comprising:
   a) a frame including a motor support section near one end of the frame, the one end being the top end of the frame when the skimmer is in use, the frame including a depending stabilizer adapted to extend into a volume of liquid when the skimmer is in use;

b) a motor carried by the support section and including an output shaft;

c) a head pulley drivingly connected to the shaft;

d) an endless belt in drivingly supported engagement with the head pulley;

e) a tail pulley supported by the belt and adapted to be immersed in such liquid volume when the skimmer is in use; and f) restraining means operatively interposed between the stabilizer and the tail pulley to limit axial and radial movement when the skimmer is being transported and to allow when in use floating movement over a range of movement free of engagement between the tail pulley and the restraining means while allowing self alignment of the belt and tail pulley and sufficient vertical motion when the skimmer is in use to assure that belt tension is provided substantially only by the weight of the belt and the pulley.

2. The skimmer of claim 1 wherein the belt is metal.

3. The skimmer of claim 2 wherein the metal is paramagnetic.

4. The skimmer of claim 1 wherein the motor shaft is generally horizontal when in use and the motor is adjustably mounted on the support section and an adjustment means is interposed between the motor and the frame for moving the motor relative to the support to adjust the shaft relative to the horizontal until the belt appropriately tracks the head pulley when in use.

5. The skimmer of claim 1 wherein the restraining means comprises a headed shaft of a diameter smaller than an axial hole in the tail pulley.

6. The skimmer of claim 5 wherein the headed shaft comprises a bolt and a washer of a diameter larger than the diameter of the tail pulley hole.

7. The skimmer of claim 1 wherein the tail pulley includes a plurality of spokes, at least a majority of which have an arm and a leg forming an L-shaped cross section wherein the arm of each L is disposed generally radially of the tail pulley and the legs of each L projects from the arm in an intended direction of pulley rotation when in use.

8. The skimmer of claim 7 wherein the tail pulley includes a tubular, axially disposed hub and the spokes are radially spaced from the hub.

9. A portable oil skimmer comprising:

a) a frame including a motor support section near one end of the frame, the one end being the top end of the frame when the skimmer is in use;

b) a gear motor pivotally connected to the support and including an output shaft;

c) the frame also including a stabilizer bar depending from the support and adapted to extend into a body of liquid when the skimmer is in use;

d) the frame also including a mounting section projecting laterally from the remainder of the frame for mounting the skimmer on a vessel containing such body of liquid;

e) a tail pulley shaft secured to and projecting laterally from the stabilizer bar, the tail pulley shaft including a body and a head spaced from the bar;

f) the output shaft and the tail pulley shaft body being spaced and generally parallel;

g) a head pulley mounted on the output shaft, the head pulley including a plurality of magnets;

h) a tail pulley positioned around the tail pulley shaft, the tail pulley including a hub having a through bore of a diameter sufficiently larger than the body to allow the tail pulley to be free to float radially of the body in a predetermined limited range;

i) the tail pulley shaft head being of a diameter larger than the bore;

j) the body having an axial length greater than the axial dimension of the tail pulley whereby to permit a head and bar constrained limited range of free, axial tail pulley movement;

k) an endless belt disposed around the pulleys in magnet-produced driven relationship with the head pulley and in rotation-producing engagement with the tail pulley, the tail pulley being supported by the belt when the skimmer is in use and the belt being tensioned only by its own weight and the weight of the tail pulley; and l) an adjustment interposed between the motor and the frame for shifting the motor about the pivotal connection and thereby adjusting the tracking of the belt on the head pulley.

10. The skimmer of claim 9 wherein a clamping means is connected to the mounting section for securing the skimmer in place.

11. The skimmer of claim 9 wherein the tail pulley shaft comprises a headed bolt and a washer of a diameter greater than the hub bore.

12. The skimmer of claim 9 wherein the belt is steel.

13. A portable oil skimmer comprising:

a) a frame including a motor support section near one end of the frame, the one end being the top end of the frame when the skimmer is in use;

b) a gear motor pivotally connected to the support and including an output shaft;

c) the frame also including a stabilizer bar depending from the support and adapted to extend into a body of liquid when the skimmer is in use;

d) the frame also including a mounting section projecting laterally from the remainder of the frame for mounting the skimmer on a vessel containing such body of liquid;

e) a tail pulley shaft secured to and projecting laterally from the stabilizer bar, the tail pulley shaft including a body and a head spaced from the bar;

f) the output shaft and the tail pulley shaft body being spaced and generally parallel;

g) head and tail pulleys being respectively mounted on the output and tail pulley shafts, the head pulley having L-shaped spokes;

h) the tail pulley including a hub having a through bore of a diameter larger than the shaft body whereby the tail pulley is free to float radially of the shaft body in a predetermined limited range;

i) the tail pulley shaft head being of a diameter larger than the bore;

j) the body having an axial length greater than the axial dimension of the tail pulley whereby to permit a head and bar constrained limited range of free, axial tail pulley movement;

k) the tail pulley including spaced end flanges interconnected by L-shaped spokes;

l) a plurality of magnets carried by at least certain of the head pulley L-shaped spokes;

m) the arms of said at least certain spokes being disposed radially of the head pulley, the legs of at least certain spokes being disposed radially inwardly of their respective arms to provide magnet supports;

n) each of the tail pulley L-shaped spokes having its arm disposed radially of the tail pulley and its leg disposed radially outwardly of its arm and oriented in a direction of tail pulley rotation;

o) an endless belt disposed around the pulleys in magnet-produced driven relationship with the head pulley and in rotation-producing engagement with the tail pulley; and p) an adjustment interposed between the motor and the frame for shifting the motor about the pivotal connection and thereby adjusting the tracking of the belt on the head pulley.

14. The skimmer of claim 13 wherein a clamping means is connected to the mounting section for securing the skimmer in place.

15. The skimmer of claim 13 wherein the tail pulley shaft comprises a headed bolt and a washer of a diameter greater than the hub bore.

16. The skimmer of claim 13 wherein the tail pulley spokes are radially spaced from the hub.

17. For use in an oil skimmer of the type having an endless belt driven by a head pulley above a body of water with oil on its surface and projecting when in use into the body, an improved tail pulley comprising:

a) a tubular hub;

b) a spaced pair of end flanges secured to the hub near its ends;

c) a set of L-shaped spokes interposed between and connected to the flanges;

d) the spokes being arranged in a circular array circumferential of and coaxial with the hub;

e) the tail pulley having a given direction of intended rotation about a pulley axis when in use, each of the spokes having a radially disposed arm and an orthogonally projecting leg extending from the arm in the given direction; and f) each spoke leg being connected to its arm near an end of the arm remote from the pulley axis.

18. The tail pulley of claim 17 wherein the spokes are radially spaced-from the hub.

19. A portable oil skimmer comprising:

a) a frame including a motor support section near one end of the frame, the one end being the top end of the frame when the skimmer is in use;

b) a gear motor pivotally connected to the support and including an output shaft;

c) the frame also including a stabilizer bar depending from the support and adapted to extend into a body of liquid when the skimmer is in use;

d) the frame also including a mounting section projecting laterally from the remainder of the frame for mounting the skimmer on a vessel containing such body of liquid;

e) a tail pulley shaft secured to and projecting laterally from the stabilizer bar, the tail pulley shaft including a body and a head spaced from the bar;

f) the output shaft and the tail pulley shaft body being spaced and generally parallel;

g) head and tail pulleys respectively mounted on the output and tail pulley shafts, the head pulley including a plurality of magnets;

h) the tail pulley including a hub having a through bore of a diameter sufficiently larger than the body to allow the tail pulley to be free to float radially of the body in a predetermined limited range;

i) the tail pulley shaft head being of a diameter larger than the bore;

j) the body having an axial length greater than the axial dimension of the tail pulley whereby to permit a head and bar constrained limited range of free, axial tail pulley movement;

k) an endless belt disposed around the pulleys in magnet-produced driven relationship with the head pulley and in rotation-producing engagement with the tail pulley;

l) an adjustment interposed between the motor and the frame for shifting the motor about the pivotal connection and thereby adjusting the tracking of the belt on the head pulley; and, m) the tail pulley including spaced end flanges interconnected by L-shaped spokes and each L-shaped spoke has its arm disposed radially of the tail pulley and its leg disposed radially outwardly of its arm and oriented in a direction of tail pulley rotation.

20. The skimmer of claim 19 wherein the tail pulley spokes are radially spaced from the hub.

* * * * *